A. H. TAYLOR.
HAMMER DRILL.
APPLICATION FILED JAN. 8, 1908.
991,667.
Patented May 9, 1911.
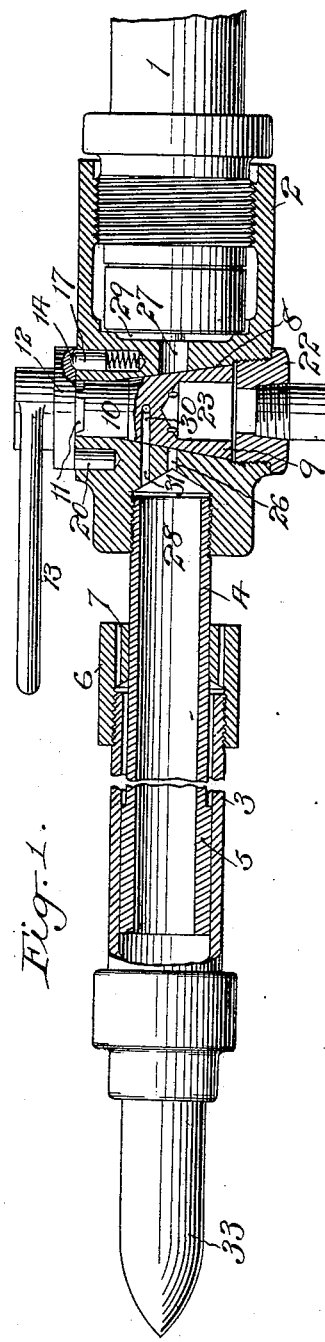
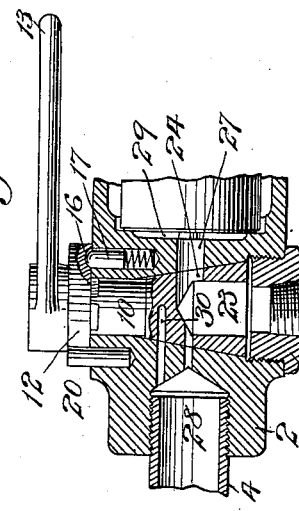
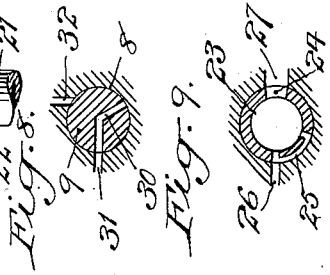
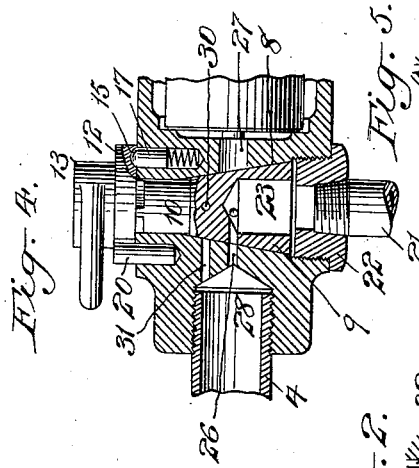
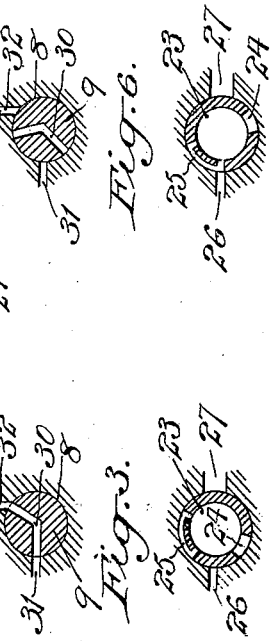
Witnesses:-
F. George Barry,
Henry Thieme.
Inventor:-
Albert H. Taylor
by attorneys
Brown & Seward

UNITED STATES PATENT OFFICE.

ALBERT H. TAYLOR, OF EASTON, PENNSYLVANIA, ASSIGNOR TO INGERSOLL-RAND COMPANY, OF NEW YORK, N. Y., A CORPORATION OF NEW JERSEY.

HAMMER-DRILL.

991,667.     Specification of Letters Patent.     Patented May 9, 1911.

Original application filed October 1, 1907, Serial No. 395,338. Divided and this application filed January 8, 1908. Serial No. 409,757.

*To all whom it may concern:*

Be it known that I, ALBERT H. TAYLOR, a citizen of the United States, and resident of Easton, in the county of Northampton and State of Pennsylvania, have invented a new and useful Improvement in Hammer-Drills, of which the following is a specification.

My invention consists in certain improvements in that class of pneumatic tools known as hammer drills, in which an air power feed is provided for forcing the tool forward and holding it in its working position.

The object of my invention is to provide a manually operated controlling valve in the head block of the drill, which valve is so constructed and arranged that it may be operated to control the admission of air to the air feed and to the hammer at pleasure, thus rendering the machine easy to handle and to set up.

A further object is to provide means for automatically locking the controlling valve in its various positions so as to prevent the same from being moved out of its desired position by the jars incident to the operation of the tool.

A practical embodiment of my invention is represented in the accompanying drawings in which—

Figure 1 represents a portion of an air feed hammer drill partially in side elevation and partially in longitudinal central section with my improvements applied thereto, the controlling valve being in position to close communication from the air supply both to the air feed and to the hammer, the air feed being in open communication with external atmosphere, Figs. 2 and 3 are detail sections showing the location of the several ports when the valve is in the position shown in Fig. 1, Fig. 4 is a detail view partially in section and partially in side elevation, the controlling valve being shown in position to open the air supply to the air feed and close communication between the air supply and the hammer, the communication between the air feed and external atmosphere also being shut off, Figs. 5 and 6 are detail sections showing the location of the several ports when the valve is in the position shown in Fig. 4, Fig. 7 is a view similar to Fig. 4, the controlling valve being shown in position to open communication between the air supply and both the air feed and hammer, the communication between the air feed and the external atmosphere being closed, Figs. 8 and 9 are detail sections showing the location of the several ports when the valve is in the position shown in Fig. 7, and Fig. 10 is a detail top plan view of the locking plate.

The hammer cylinder is denoted by 1 and its head block by 2. The air feed cylinder is denoted by 3 and the piston rod by 4. The piston rod is attached directly to the head block and it extends rearwardly through the front end 6 of the cylinder 3, the rear end of the said cylinder being provided with a rearward extension 33 for forming the rear support for the tool. The space in front of the piston head 5 is at all times open to external atmosphere through the ports 7 in the front end 6 of the cylinder and the piston rod 4 is made hollow for opening communication to the cylinder space at the back of the said piston head.

The head block 2 of the tool is provided with a hole therethrough, a portion of which forms a tapered seat 8 for the tapered portion 9 of a controlling valve. The cylindrical portion 10 of the said valve at the end of its tapered portion is provided with an angular portion 11 on which is fixed the locking plate 12 and the handle 13 of the valve, exterior to the head block. This locking plate 12 has its inner face adjacent to the outer face of the head block and it is provided with three shallow recesses 14, 15, 16, arranged to respectively receive and retain against unintentional removal the rounded end of a spring actuated sliding pin 17 mounted in the head block. The locking plate 12 is further provided with shoulders 18, 19, arranged to engage the projecting end of a stop 20 on the head block for limiting the rotary movement of the controlling valve in both directions.

An air supply pipe 21 is secured to the head block 2 by a collar 22 having a screw-threaded engagement with the hole in the head block beyond its tapered seat 8. The controlling valve is provided with a chamber 23 in open communication with the air supply pipe 21. Ports 24, 25, in the valve lead from the chamber 23 to the seat 8 in the head block. Ports 26, 27, lead repectively from the seat 8 to the air feed space 28 and to the hammer feed space 29, said ports being in the same plane as the valve ports 24, 25. The valve is further provided with a through port 30. Ports 31, 32, in the same plane as the through port 30, lead from the valve seat 8 to the air feed space 28 and to the external atmosphere respectively.

In operation, supposing the parts to be in the position shown in Figs. 1, 2 and 3, the air supply will be shut off from both the air feed and the hammer and the air feed will be open to external atmosphere. When the parts are in this position, the shoulder 19 of the locking plate 12 on the valve will be in engagement with the stop 20 and the locking pin 17 will be located within its socket 14. The movement of the valve into the position shown in Figs. 4, 5, 6, will close communication from the air feed to external atmosphere and will open communication from the air feed to the air supply but will not open the air supply to the hammer. When the parts are in this position, the tool will be automatically fed up to its work and held by the air feed. The spring-actuated locking pin 17 will be located in its socket 15, thus holding the valve against unintentional movement. The movement of the valve into the position shown in Figs. 7, 8, 9, will still keep communication open between the air supply and the air feed and will bring the air supply also into open communication with the hammer, thus starting the operation of the tool. The valve is stopped in this position by the engagement of the shoulder 18 on the locking plate 12 with the stop 20 and the valve is held in such position against unintentional movement by the engagement of the spring actuated locking pin 17 with its socket 16. By returning the controlling valve to its original position shown in Figs. 1, 2 and 3, the air supply is cut off from both the hammer and the air feed and the air feed is brought into open communication with external atmosphere, thus removing the pressure from the air feed piston and permitting the readjustment of the tool to any desired position.

In the construction above set forth it will be seen that a very simple and effective means is employed for controlling the admission of air from the air supply to the air feed and the hammer. It will further be seen that all the wear upon the valve and its seat is taken up automatically by the constant air pressure from the air supply. Furthermore, means are provided for locking the valve in its several positions against unintentional removal.

While the invention has been described in connection with an air power feed hammer drill, any other fluid power may be utilized and any type of tool may be employed without departing from the spirit and scope of my invention.

What I claim is:

1. In an air feed hammer drill, a head block, an air supply, an air feed cylinder, its piston attached directly to the head block and a manually operated valve in the head block having passages arranged when in one position to open communication between the air supply and the air feed cylinder and close communication between the air supply and hammer and when in another position to open communication between the air supply, the air feed cylinder and the hammer.

2. In an air feed hammer drill, a head block, an air supply, an air feed cylinder, its piston attached directly to the head block and a manually operated valve in the head block having passages arranged when in its first position to open communication between the air feed cylinder and external atmosphere and close communication between the air supply, the air feed cylinder and the hammer; when in its second position to close communication between the air feed cylinder and external atmosphere and between the air supply and hammer and to open communication between the air supply and air feed cylinder and when in its third position to open communication between the air supply, the air feed cylinder and the hammer.

3. In an air feed hammer drill, a head block, an air supply, an air feed cylinder, its piston attached directly to the head block, a manually operated valve in the head block for controlling communication between the air supply, the air feed cylinder and the hammer and means for automatically locking the valve in its different positions against unintentional displacement.

4. In an air feed hammer drill, a head block, an air supply, an air feed cylinder, its piston attached directly to the head block, a manually operated valve in the head block for controlling communication between the air supply, the air feed cylinder and the hammer, and means for automatically locking the valve in its different positions against unintentional displacement comprising a locking plate on the valve having sockets therein and a spring actuated pin mounted in the head block arranged to enter the socket which is brought into alinement therewith.

5. In an air feed hammer drill, a head block, an air supply, an air feed cylinder having a rearward extension forming a rear support for the tool, a piston fitted to reciprocate in the cylinder and attached directly to the head block and a manually operated valve in the head block for controlling communication between the air supply, the air feed cylinder and the hammer.

6. In a structure of the character set forth, the combination with a motor having a rear body, of feeding means including a cylinder and a piston having a tubular rod connected to the rear body, said body having a valve seat and ports leading therefrom to the motor and to the interior of the piston rod, a valve in the seat controlling the ports, and means for supplying motive fluid to the valve.

7. In an air feed hammer drill, a hammer cylinder, an air feed cylinder, its hollow piston, a head block interposed between the hammer cylinder and hollow piston, an air supply and a manually operated valve seat in the head block having a chamber therein communicating with the air supply and having ports therein for controlling communication between the air supply, the hollow piston and the hammer, the pressure of the air supply serving to hold the valve snugly in its seat.

8. In a structure of the character set forth, the combination with a motor, of feeding means therefor including a cylinder member and a piston member operating in the cylinder member, a connection between the piston member and the motor and a valve mechanism located in the connection for separately controlling the supply of motive fluid to the feeding means and to the feeding means and motor.

9. In a structure of the character set forth, the combination with a motor, of feeding means therefore including a cylinder member and a piston member operating in the cylinder member, a connection between the piston member and the motor interposed between the same, said connection having ports respectively leading to the feeding means and to the motor and a motive fluid controlling valve having supply ports that are movable into and out of coaction with the first-mentioned ports.

10. In a structure of the character set forth, the combination with a motor, of feeding means therefor including a cylinder and a piston operating in the cylinder, a connection between the piston and the motor interposed between the two, said connection having a valve seat and ports leading from the seat and communicating respectively with the motor and the cylinder, a rotary valve having ports that are movable into and out of coaction with the first-mentioned ports and means for supplying motive fluid to the valve.

11. In a structure of the character set forth, the combination with a motor, of feeding means therefor including a cylinder member and a piston member operating in the cylinder member, a connection between the piston member and the motor located between the same and valve mechanism located in the connection and interposed between the motor and member for controlling the supply and exhaust of motive fluid to and from the feeding means and for controlling the supply of motive fluid to the motor.

In testimony, that I claim the foregoing as my invention, I have signed my name in presence of two witnesses, this sixth day of January 1908.

ALBERT H. TAYLOR.

Witnesses:
CHAS. B. BRUNNER,
RUSSELL H. WILHELM.

---

Copies of this patent may be obtained for five cents each, by addressing the "Commissioner of Patents, Washington, D. C."